United States Patent
Katz et al.

(10) Patent No.: US 12,537,800 B2
(45) Date of Patent: Jan. 27, 2026

(54) APPARATUS AND METHOD FOR REMOTE ACCESS TO COMMUNICATION SYSTEMS

(71) Applicant: Byos Inc., Ottawa (CA)

(72) Inventors: Matias Katz, Ottawa (CA); Cristian Amicelli, Ottawa (CA); Cristobal Del Pino, Ottawa (CA); Ryan Bunker, Ottawa (CA)

(73) Assignee: Byos Inc. (CA)

( * ) Notice: Subject to any disclaimer, the term of this patent is extended or adjusted under 35 U.S.C. 154(b) by 122 days.

(21) Appl. No.: 18/691,829

(22) PCT Filed: Sep. 14, 2022

(86) PCT No.: PCT/CA2022/051372
§ 371 (c)(1),
(2) Date: Mar. 13, 2024

(87) PCT Pub. No.: WO2023/039669
PCT Pub. Date: Mar. 23, 2023

(65) Prior Publication Data
US 2024/0380736 A1  Nov. 14, 2024

Related U.S. Application Data

(60) Provisional application No. 63/261,192, filed on Sep. 14, 2021.

(51) Int. Cl.
*H04L 29/06* (2006.01)
*H04L 9/40* (2022.01)
(52) U.S. Cl.
CPC ........ *H04L 63/0272* (2013.01); *H04L 63/029* (2013.01); *H04L 63/101* (2013.01)

(58) Field of Classification Search
None
See application file for complete search history.

(56) References Cited

U.S. PATENT DOCUMENTS 8,079,059 B1 * 12/2011 Lee .................. H04L 67/131
                                                    713/153
8,422,502 B1 *  4/2013 Alaettinoglu ........ H04L 45/38
                                                    370/395.3

(Continued)

FOREIGN PATENT DOCUMENTS

WO        2015121389 A1     8/2015

*Primary Examiner* — Shin-Hon (Eric) Chen
(74) *Attorney, Agent, or Firm* — DENTONS DAVIS BROWN PC; Matthew Warner-Blankenship

(57) ABSTRACT

According to an aspect, there is provided a method for conditionally enabling access to endpoint devices of a microsegment within a private network from a management console which is external to the private network. A secure edge device discovers all of the endpoint devices within the microsegment and identifies which endpoint devices are connectable devices. A secure lobby node conveys to the management console information identifying all of the endpoint devices and which endpoint devices are connectable devices. Thus, a user of the management console can easily learn what endpoint devices are in the microsegment and which endpoint devices are connectable devices, such that the user can then choose to remotely connect to one or more of the connectable devices. Notably, the secure lobby node and the secure edge device enable one-hop traffic between the management console and any of the connectable devices of the microsegment.

12 Claims, 18 Drawing Sheets

(56) References Cited

U.S. PATENT DOCUMENTS

| | | | |
|---|---|---|---|
| 10,986,133 B1 | 4/2021 | Lee | |
| 2014/0215580 A1* | 7/2014 | Behringer | H04L 63/105 |
| | | | 726/5 |
| 2017/0195332 A1* | 7/2017 | Wu | G06F 3/04845 |
| 2017/0237742 A1 | 8/2017 | Salmela | |
| 2019/0349426 A1* | 11/2019 | Smith | H04L 9/3239 |
| 2020/0136906 A1 | 4/2020 | Guim | |
| 2020/0177550 A1 | 6/2020 | Valluri | |
| 2020/0244720 A1* | 7/2020 | Balthaser | H04L 63/0272 |
| 2020/0358878 A1* | 11/2020 | Bansal | H04L 63/0876 |
| 2021/0112034 A1* | 4/2021 | Sundararajan | H04L 47/125 |
| 2021/0273913 A1* | 9/2021 | Bosch | H04L 63/0815 |
| 2022/0109684 A1* | 4/2022 | Jain | H04L 63/1425 |
| 2023/0097517 A1* | 3/2023 | Heranjal | H04L 45/38 |
| | | | 709/238 |

* cited by examiner

FIG. 3

| Endpoint | IP Addr. | MAC Addr. | Port IN | Port OUT | Service | Vendor | Description | Last Seen | Secure Lobby Status | Secure Lobby Actions |
|---|---|---|---|---|---|---|---|---|---|---|
| ssh-demo | 10.10.4.2 | dc:A6:32:d3:bd:13 | 22 | 22 | ssh | Raspberry Pi Trading Ltd. | | 2021/08/24 11:57:37 | ≡ 401 | Add\|Scan Ports 402 |
| Desktop-FB6M6C | 10.10.4.3 | 68:17:29:4a:18:70 | 3389 | 3389 | ms-wbt-server | Lcfc(HeFei) Electronics Tech Co. Ltd | | 2021/08/24 11:57:37 | ≡ | Add\|Scan Ports |
| AMC000A2_C517D | 10.10.4.6 | 9c:8e:cd:17:4a:63 | 80 | 80 | http | Amcrest Tech | | 2021/08/24 11:57:37 | ≡ | Add\|Scan Ports |
| AMC000A2_C517D | 10.10.4.6 | 9c:8e:cd:17:4a:63 | 554 | 554 | rtsp | Amcrest Tech | | 2021/08/24 11:57:37 | ≡ | Add |
| AMC000A2_C517D | 10.10.4.6 | 9c:8e:cd:17:4a:63 | 5000 | 5000 | upnp | Amcrest Tech | | 2021/08/24 11:57:37 | ≡ | Add |
| AMC000A2_C517D | 10.10.4.6 | 9c:8e:cd:17:4a:63 | 49152 | 49152 | unknown | Amcrest Tech | | 2021/08/24 11:57:37 | ≡ | Add |

| Byos Mgmt Console - Ryan | + | | | | | | | | |
|---|---|---|---|---|---|---|---|---|---|
| ◁ ▷ C | ⊡ | 🔒 demo.byos.network/index.php# | | | | | | ⭐ ☆ | ≡ |

≡ ○ △ 🔔 ⚙

Users ⬥
- ⚑ 1 Multi devices
- ⚑ 2 Multi devices
- ⚑ Christian Gateway
- ⚑ demo@byos.io
- ⚑ demo@byos.io
- ⚑ Matias Home
- ⚑ Ryan Office
- ⚑ Christian Dev
- ⚑ demo@byos.io
- ⚑ demo@byos.io User: 2 Multi devices
Group: Secure Lobby RDP
Last Seen: Now

- ☑ Live Feed
- ☐ Alert List
- ○ Secure Lobby

Secure Lobby [On]
Internet Access [On]
[Change Group]
[Properties]
[Reboot Device]

Secure Lobby Connecting...

Filter: Search _____                                                                 Show: 50 entries

| Endpoint ⬥ | IP Addr. ▲ | MAC Addr. ⬥ | Port IN ⬥ | Port OUT ⬥ | Service ⬥ | Vendor ⬥ | Description ⬥ | Last Seen ⬥ | Secure Lobby Status ⬥ | Secure Lobby Actions ⬥ |
|---|---|---|---|---|---|---|---|---|---|---|
| N/A | 10.10.4.100 | 00:01:45:06:49:29 | 3001 | 3001 | nessus | Winsystems. Inc | | 2021/08/23 12:21:04 | ⊘ | Edit\|Remove\|Scan Ports |
| N/A | 10.10.4.100 | 00:01:45:06:49:29 | 1025 | 1025 | NFS-or-IS | Winsystems. Inc | | 2021/08/23 12:21:04 | ≡ | Save |
| Desktop-G5IEPE | 10.10.4.2 | 68:f7:28:59:26:8d | 3389 | 3389 | ms-wbt-server | LcfcHeFei Electronics Tech Co. Ltd | | 2021/08/23 12:21:04 | ≡ | Save\|Scan Ports |
| Linux-Multi | 10.10.4.3 | dc:a8:32:d3:bb:81 | 21 | 21 | ftp | Raspberry Pi Trading Ltd. | | 2021/08/23 12:21:04 | ≡ | Save |
| Linux-Multi | 10.10.4.3 | dc:a8:32:d3:bb:81 | 22 | 22 | ssh | Raspberry Pi Trading Ltd. | | 2021/08/23 12:21:04 | ≡ | Save\|Scan Ports |
| Linux-Multi | 10.10.4.3 | dc:a8:32:d3:bb:81 | 80 | 80 | http | Raspberry Pi Trading Ltd. | | 2021/08/23 12:21:04 | ≡ | Save |

Showing 1 to 6 of 6 entries                 [Add Endpoint] [Run Discovery]                    [Previous] [1] [Next]

| Byos Mgmt Console - Ryan | + | | | | | | |
|---|---|---|---|---|---|---|---|

◁ ▷ C | 🔒 demo.byos.network/index.php# | □ ☆ ⋮

≡ | 🔔 ⚙

Users ⬥
- 👥 1 Multi devices
- 👥 2 Multi devices
- 👥 Christian Gateway
- 👤 demo@byos.io
- 👤 demo@byos.io
- 👤 Matias Home
- 👤 Ryan Office
- 👤 Christian Dev
- 👤 demo@byos.io
- 👤 demo@byos.io User: 2 Multi devices
Group: Secure Lobby RDP
Last Seen: Now ☑ Live Feed
☐ Alert List ○ Secure Lobby Secure Lobby [On]
Internet Access [On]

[Change Group]
[Properties]
[Reboot Device]

Secure Lobby ⌐Connected⌐ IP Address: 172.20.0.14⌐ ~701
Filter: Search _____                                  Show: 50 entries

| Endpoint ⬥ | IP Addr. ▲ | MAC Addr. ⬥ | Port IN ⬥ | Port OUT ⬥ | Service ⬥ | Vendor ⬥ | Description ⬥ | Last Seen ⬥ | Secure Lobby Status ⬥ | Secure Lobby Actions ⬥ |
|---|---|---|---|---|---|---|---|---|---|---|
| N/A | 10.10.4.100 | 00:01:45:06:49:29 | 3001 | 3001 | nessus | Winsystems, Inc | | Now | ⊘ | Edit\|Remove\|Scan Ports |
| N/A | 10.10.4.100 | 00:01:45:06:49:29 | 1025 | 1025 | NFS-or-IS | Winsystems, Inc | | 2021/08/23 12:21:04 | ⋮ | Save |
| Desktop-G5IEPE | 10.10.4.2 | 68:f7:28:59:26:8d | 3389 | 3389 | ms-wbt-server | Lcfc(HeFei) Electronics Tech Co. Ltd | | 2021/08/23 12:21:04 | ⋮ | Save\|Scan Ports |
| Linux-Multi | 10.10.4.3 | dc:a8:32:d3:bb:81 | 21 | 21 | ftp | Raspberry Pi Trading Ltd. | | 2021/08/23 12:21:04 | ⋮ | Save\|Scan Ports |
| Linux-Multi | 10.10.4.3 | dc:a8:32:d3:bb:81 | 22 | 22 | ssh | Raspberry Pi Trading Ltd. | | 2021/08/23 12:21:04 | ⋮ | Save |
| Linux-Multi | 10.10.4.3 | dc:a8:32:d3:bb:81 | 80 | 80 | http | Raspberry Pi Trading Ltd. | | 2021/08/23 12:21:04 | ⋮ | Save |

702

Showing 1 to 6 of 6 entries   [Add Endpoint] [Run Discovery]        [Previous] [1] [Next]

FIG. 7

Byos Mgmt Console - Ryan demo.byos.network/index.php#

Users
- 1 Multi devices
- 2 Multi devices
- Christian Gateway
- demo@byos.io
- demo@byos.io
- Matias Home
- Ryan Office
- Christian Dev
- demo@byos.io
- demo@byos.io User: 1 Multi devices
Group: Secure Lobby SSH
Last Seen: Now

- ☑ Live Feed
- ☐ Alert List
- ○ Secure Lobby

Secure Lobby [On]
Internet Access [On]

[Change Group]
[Properties]
[Reboot Device]

Secure Lobby Connected IP Address: 172.20.0.122 ~801

Filter: Search                                    Show: 50 entries

| Endpoint | IP Addr. | MAC Addr. | Port IN | Port OUT | Service | Vendor | Description | Last Seen | Secure Lobby Status | Actions |
|---|---|---|---|---|---|---|---|---|---|---|
| ssh-demo | 10.10.4.2 | dc:A6:32:d3:bd:13 | 22 | 22 | ssh | Raspberry Pi Trading Ltd. | SSH | Now | ⊘ | Edit\|Remove\|Scan Ports |
| Desktop-FB6M6C | 10.10.4.3 | 68:17:29:4a:18:70 | 3389 | 3389 | ms-wbt-server | Lcfc(HeFei) Electronics Tech Co. Ltd | RDP | Now | ⊘ | Edit\|Remove\|Scan Ports |
| AMC000A2_C517D | 10.10.4.6 | 9c:8e:cd:17:4a:63 | 80 | 80 | http | Amcrest Tech | IP Camera | Now | ⊘ | Edit\|Remove\|Scan Ports |
| AMC000A2_C517D | 10.10.4.6 | 9c:8e:cd:17:4a:63 | 554 | 554 | rtsp | Amcrest Tech | | 2021/08/24 11:57:37 | ≡ | Add |
| AMC000A2_C517D | 10.10.4.6 | 9c:8e:cd:17:4a:63 | 5000 | 5000 | upnp | Amcrest Tech | | 2021/08/24 11:57:37 | ≡ | Add |
| AMC000A2_C517D | 10.10.4.6 | 9c:8e:cd:17:4a:63 | 49152 | 49152 | unknown | Amcrest Tech | | 2021/08/24 11:57:37 | ≡ | Add |

802

Showing 1 to 6 of 6 entries    [Add Endpoint] [Run Discovery]    [Previous] [1] [Next]

FIG. 8

APPARATUS AND METHOD FOR REMOTE ACCESS TO COMMUNICATION SYSTEMS

RELATED APPLICATIONS

This patent application is the United States national stage of international application no. PCT/CA2022/051372 filed on Sep. 14, 2022, which in turn claims the benefit of priority to U.S. provisional patent application No. 63/261,192 filed on Sep. 14, 2021. Both of international application no. PCT/CA2022/051372 and U.S. Provisional Patent Application No. 63/261,192 are hereby incorporated herein by reference in their entirety.

FIELD OF THE DISCLOSURE

This disclosure relates to communication systems, and more particularly to remote access to communication systems.

BACKGROUND

Conventional remote access tools may involve opening up a perimeter, which adds unnecessary exposure risk to entire corporate networks.

A public static IP can be found by anyone, as it is public. It allows inbound connections and exposes the network. If not secured correctly, other devices could be accessed. It is vulnerable and leaves room for error.

A VPN (Virtual Private Network) tunnel to connect allows an inbound connection, meaning there is a VPN server to maintain, and an inbound connection allowed. With a normal VPN connection for any user/device, four items are normally utilised to establish the VPN connection: username, password, certificate, and configuration file, also known as the process of VPN Key Management. These "keys" may be created, shared, deployed, managed, rotated, and destroyed to ensure the VPN connection is working properly and is secured. Key management, at scale with 100 s or 1000 s of endpoint devices and users, becomes cumbersome and inefficient. For example, someone may need to make sure the passwords are rotated, and ensure that the server is up to date and set up right. This may involve ongoing IT effort and can introduce other points of failure. Moreover, VPNs are by default inherently open, broad, and insecure. They connect point A to point B bidirectionally, and allow all traffic to go both ways.

It is an object to mitigate or remove the operational overhead and security risks associated with these more traditional approaches to remote access communications.

SUMMARY OF THE DISCLOSURE

According to an aspect, there is provided a method for conditionally enabling access to endpoint devices of a microsegment within a private network from a management console which is external to the private network. The microsegment has a secure edge device which restricts traffic between the endpoint devices of the microsegment and devices outside of the microsegment.

The method involves the secure edge device establishing an edge connection with a secure lobby node which is external to the private network. The method also involves the secure edge device discovering all of the endpoint devices within the microsegment, identifying which of the endpoint devices are connectable devices, and establishing a route connection for each connectable device. The method also involves the secure edge device transmitting information to the secure lobby node to identify all of the endpoint devices and which of the endpoint devices are connectable devices.

Upon a console connection being established between the management console and the secure lobby node, the secure lobby node conveys to the management console the information identifying all of the endpoint devices and which of the endpoint devices are connectable devices. Thus, a user of the management console can easily learn what endpoint devices are in the microsegment and which endpoint devices are connectable devices, such that the user can then choose to remotely connect to one or more of the connectable devices.

Notably, the secure lobby node and the secure edge device enable one-hop traffic between the management console and any of the connectable devices of the microsegment via a secure connection including the console connection, the edge connection, and the route connection for the connectable device. In this way, it is possible for the user to access the connectable devices without having to be on site and within the private network. Instead, the user can remain remote from the private network, and still gain access to the connectable devices even though they are protected by the microsegment established by the secure edge device.

In some implementations, the secure edge device identifies what services are permitted for each connectable device, and transmits information to the secure lobby node identifying what services are permitted for each connectable device. The secure lobby node can then convey to the management console the information identifying what services are permitted for each connectable device. Thus, the user of the management console can easily learn what services can be executed for the connectable devices. Other services can remain restricted.

According to another aspect, there is provided a non-transitory computer readable medium having recorded thereon statements and instructions that, when executed by processors of a communication system, implement a method as summarized above.

According to another aspect, there is provided a combination of a secure lobby node and at least one secure edge device for use in a communication system configured to implement a method as summarized above.

Other aspects and features of the present disclosure will become apparent, to those ordinarily skilled in the art, upon review of the following description of the various embodiments of the disclosure.

BRIEF DESCRIPTION OF THE DRAWINGS

Embodiments will now be described with reference to the attached drawings in which:

FIGS. 3 through 16 are screenshots of an example GUI (Graphic User Interface) enabled by a secure lobby node for display by a management console to facilitate conditional access to endpoint devices of a microsegment within a private network.

DETAILED DESCRIPTION OF EMBODIMENTS

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Introduction

Figure 1A:
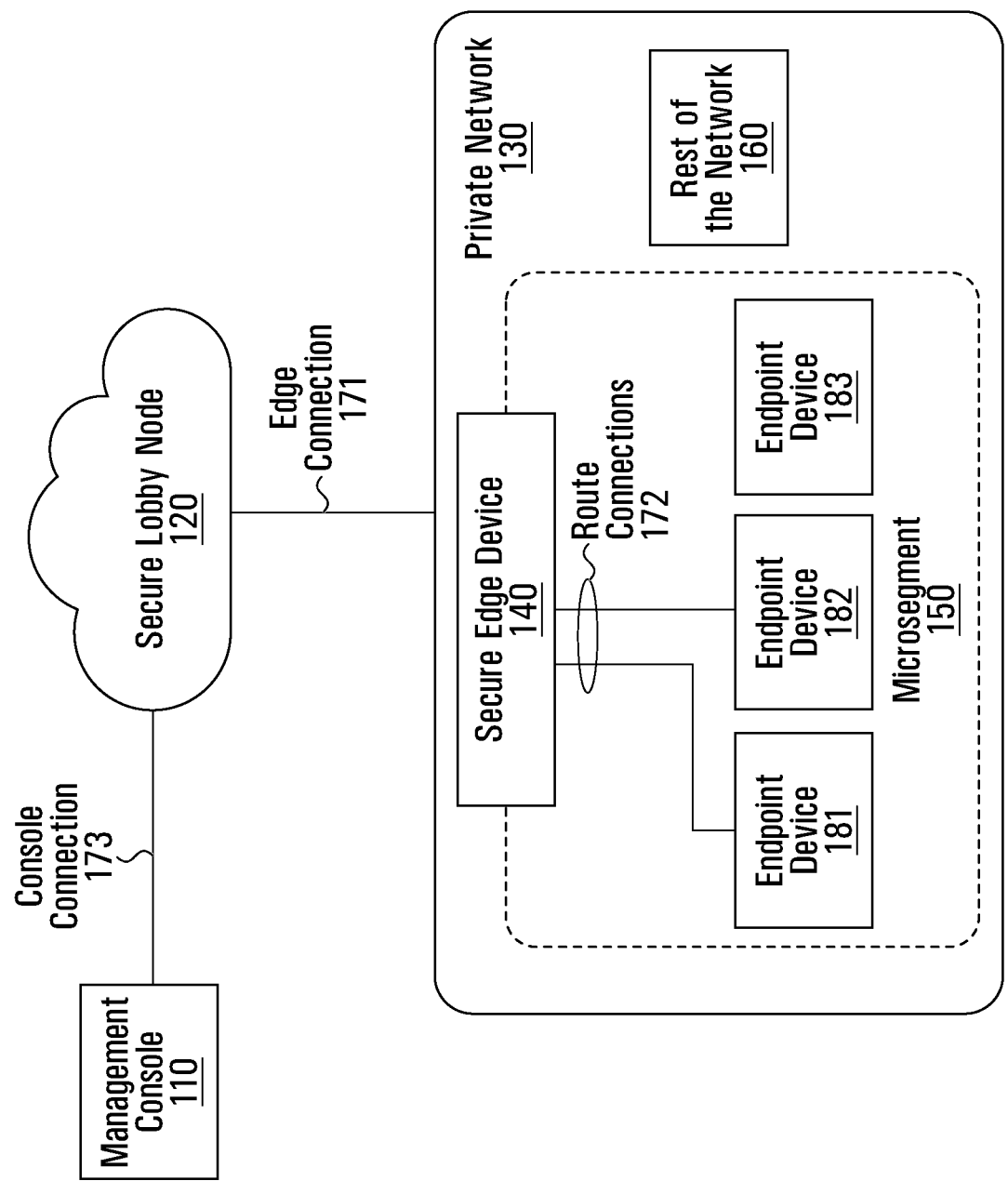
FIG. 1A is a block diagram of an example communication system featuring a microsegment within a private network and a secure lobby node which is external to the private network.

Referring first to FIG. 1A, shown is a block diagram of an example communication system featuring a microsegment 150 within a private network 130 and a secure lobby node 120 which is external to the private network 130. The microsegment 150 has a secure edge device 140 which restricts traffic between the endpoint devices 181-183 of the microsegment 150 and devices outside of the microsegment 150. Thus, the endpoint devices 181-183 do not have access to the rest of the network 160 or even the Internet. The secure edge device 140 allows traffic only between the endpoint devices 181-183 inside of the microsegment 150 and an administrator's computer 110 connected to secure lobby node 120.

Although only one microsegment 150 with three endpoint devices 181-183 is shown, it is noted that there may be several microsegments with varying number of endpoint devices in each microsegment. The communication system may have other components but they are not shown for simplicity.

Figure 2:
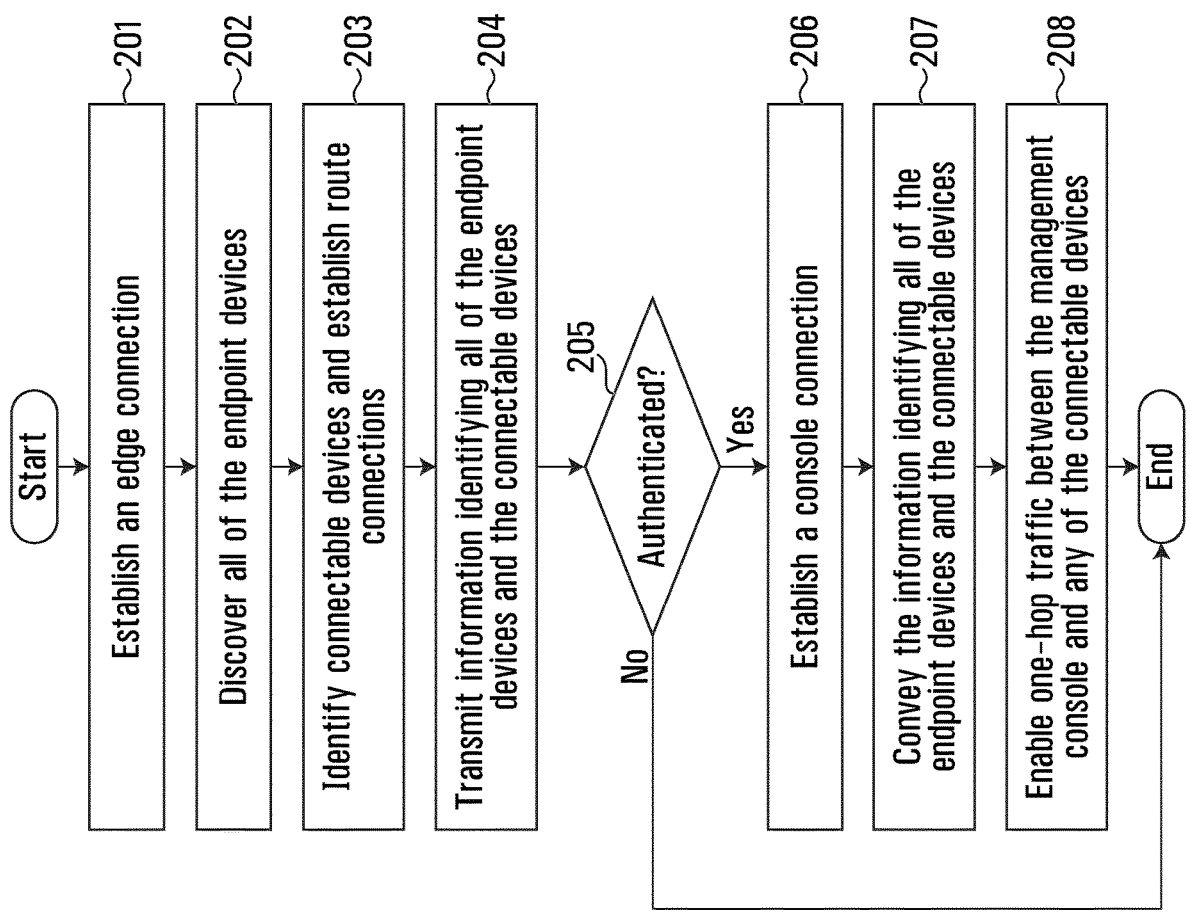
FIG. 2 is a flowchart of an example method for conditionally enabling access to endpoint devices of a microsegment within a private network from a management console which is external to the private network.
Figure 9:
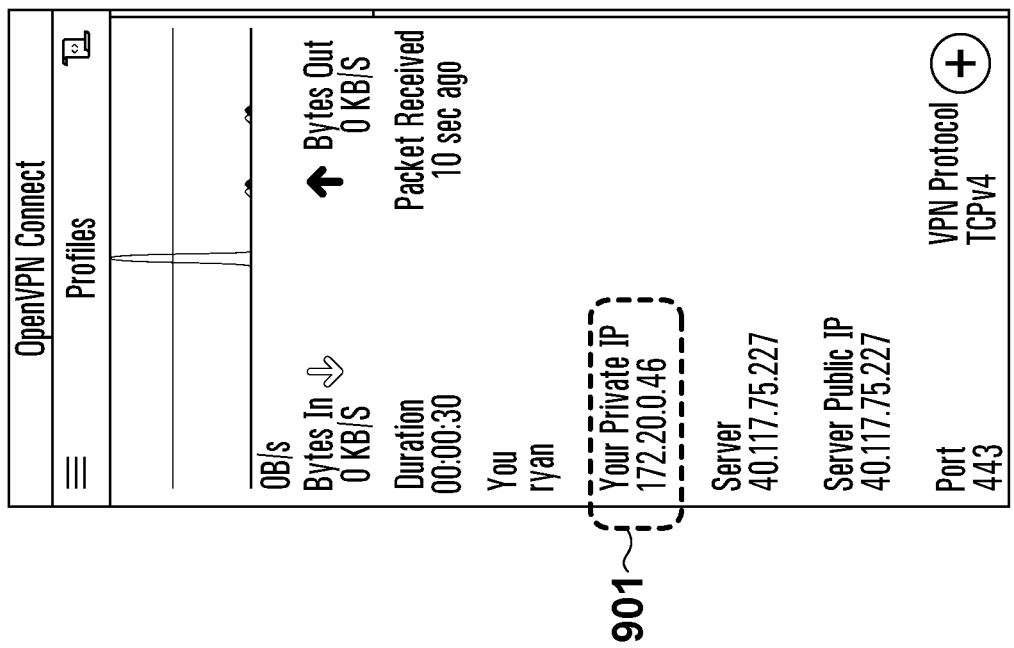

Operation of the communication system will be described below with reference to FIG. 2, which is a flowchart of an example method for conditionally enabling access to the endpoint devices 181-183 of the microsegment 150 within the private network 130 from a management console 110 which is external to the private network 130. Although the method of FIG. 2 is described with reference to the communication system of FIG. 1A, it is to be understood that the method of FIG. 2 is applicable to other communication systems. In general, the method of FIG. 2 is applicable to any appropriately configured communication system.

At step 201, the secure edge device 140 establishes an edge connection 171 with the secure lobby node 120 which is external to the private network 130. At step 202, the secure edge device 140 discovers all of the endpoint devices 181-183 within the microsegment 150. Next, at step 203, the secure edge device 140 identifies which of the endpoint devices 181-183 are connectable devices 181-182, and establishes a route connection 172 for each connectable device 181-182. Typically the connectable devices 181-182 are a subset of the endpoint devices 181-183 (e.g. the first two endpoint devices 181-182 are connectable while the third endpoint device 183 is not connectable), although it is possible that all of the endpoint devices 181-183 are connectable. At step 204, the secure edge device 140 transmits information to the secure lobby node 120 to identify all of the endpoint devices 181-183 and which of the endpoint devices 181-183 are connectable devices 181-182.

In some implementations, as shown at step 205, the secure lobby node 120 attempts to authenticate the management console 110 for permission to access the microsegment 150. In some implementations, a secure connection between the management console 110 and the secure lobby node 120 is established only if the management console 110 has been authenticated. The secure connection includes a console connection 173 between the management console 110 and the secure lobby node 120, the edge connection 171, and the route connection 172 for the connectable device 181-182. Thus, the console connection 173 might be established at step 206 only upon authenticating the management console 110.

There are many ways that the secure lobby node 120 can authenticate the management console 110 for permission to access the microsegment 150. In some implementations, a user of the management console 110 is provided with an email containing a configuration file which is used by the secure lobby node 120 to authenticate the user. In particular, the secure lobby node 120 would confirm whether the management console 110 has a valid configuration file. In some implementations, connections to the secure lobby node 120 are facilitated by private OpenVPN configurations, unique to each administrator who has access to the management console 110. In some implementations, the only way someone can enter the secure lobby is if they have this config file and have connected to the secure lobby node 120. In some implementations, the configuration file is downloaded for OpenVPN by other means other than email. Other implementations are possible.

At step 207, upon the management console 110 being authenticated and the console connection 173 being established to complete the secure connection between the management console 110 and the secure lobby node 120, the secure lobby node 120 conveys to the management console 110 the information identifying all of the endpoint devices 181-183 and which of the endpoint devices 181-183 are connectable devices 181-182. This information is provided to the management console 110 while the management console 110 is accessing a secure lobby provided by the secure lobby node 120. Thus, the user of the management console 110 can easily learn what endpoint devices 181-183 are in the microsegment 150 and which endpoint devices 181-183 are connectable devices 181-182, such that the user can then choose to remotely connect to one or more of the connectable devices 181-182.

At step 208, the secure lobby node 120 and the secure edge device 140 enable one-hop traffic between the management console 110 and any of the connectable devices 181-182 of the microsegment 150 via the secure connection including the console connection 173, the edge connection 171, and the route connection 172 for the connectable device 181-182. In this way, it is possible for the user to access the connectable devices 181-182 without having to be on site and within the private network 130. Instead, the user can remain remote from the private network 130, and still gain access to the connectable devices 181-182 even though they are protected by the microsegment 150 established by the secure edge device 140.

In some implementations, the secure edge device 140 identifies what services are permitted for each connectable device 181-182, and transmits information to the secure lobby node 120 identifying what services are permitted for each connectable device 181-182. The secure lobby node 120 can then convey to the management console 110 the information identifying what services are permitted for each connectable device 181-182. Thus, the user of the management console 110 can easily learn what services can be executed for the connectable devices 181-182. Other services can remain restricted.

In some implementations, the secure edge device 140 maintains a transport layer permission list, which is used by the secure edge device 140 to identify what services are permitted for each connectable device 181-182. In some implementations, the transport layer permission list can be updated by the secure edge device 140 in response to input from the management console 110. In this way, the user can make changes to enable or disable services on a transport layer (i.e. layer 4).

In some implementations, the secure edge device 140 maintains a session layer permission list, which is used by the secure edge device 140 to identify which of the endpoint devices 181-183 are connectable devices 181-182. In some implementations, the session layer permission list defines zones within the private network 130 and permissions for users to access those zones. The zones are and overlay and generally independent of network architecture. In some implementations, the session layer permission list can be updated by the secure edge device 140 in response to input from the management console 110. In this way, the user can make changes to enable or disable the endpoint devices 181-183 from being connectable on a session layer (i.e. layer 3).

In some implementations, zones are the highest architectural "unit" within the network. The network can be divisible across unit hierarchy: Zones>Groups>Edges>Assets>Endpoints. Zones are what control how, who, what, and where traffic is allowed to move within the Network. In some implementations, administrators can configure IP address segments 10.X.0.0./16 for creating different zones. In some implementations, groups are placed inside of the zones. In some implementations, super administrators grant role-based access control to the zones for administrators, groups and guests. Example details regarding rules that can be set for zone management are provide later.

The transport layer permission list and the session layer permission list enable transparent access control at layers 3 and 4 in a way that is impossible to manipulate or control by end users. Embodiments of the disclose create an overlay network, and traffic to and from the overlay network can be filtered by the above at the same time that traffic to and from outside of the overlay can be blocked while endpoints remain invisible. The overlay network is largely independent from the physical network.

In some implementations, the secure connection between the management console 110 and the connectable devices 181-182 is a layer 4 VPN (Virtual Private Network) connection which can remain open even if the management console 110 switches between networks. In some implementations, the layer 4 VPN connection is an RSA (Rivest-Shamir-Adleman) encrypted connection. In specific implementations, the RSA encrypted connection has a key size of 4096 bits.

As noted above, conventional VPNs are by default inherently open, broad, and insecure. They connect point A to point B bidirectionally, and allow all traffic to go both ways. However, embodiments of the disclose cut off that bidirectionality, does not allow broad access, does not allow to move laterally inside the remote network, and allows for layer 3 and layer 4 granular access control from the admin side (Cloud console) without having to send config files to devices anywhere. This is a substantial improvement over conventional VPNs.

In some implementations, an administrator will be able to access an endpoint devices 181-182 in the microsegment only when two conditions are met from the management console 110:
1. The secure edge device 140 has run its microsegment discovery feature and the endpoint devices 181-183 have been found and added into the secure lobby.
2. The connection for the secure lobby is initiated and the microsegment is given a private IP address, which matches the private IP address given by the OpenVPN config file.

Otherwise, nothing can speak to the endpoint devices inside of the microsegment without the secure edge device allowing it. In some implementations, the only way in is if the secure edge device connects out, someone logs into Management Console and has credentials to initiate the remote connection using the secure lobby. In some implementations, endpoint devices inside the secure lobby cannot talk to each other because they are microsegmented and are unable to communicate.

In some implementations, the secure lobby node 120 enables zero-trust remote access to endpoint devices 181-183 inside of a protected microsegment 150 created by the secure edge device 140 and can enable benefits such as:
  secure remote monitoring, updating, patching, and troubleshooting,
  increased control over 3rd-party access to endpoint devices 181-183,
  no network or endpoint exposure, reducing risk of lateral infections, and
  reduced trips onsite for maintenance saving operational expenses.

Example operational benefit: Whenever there is an action to be done to an endpoint device inside of a microsegment (a critical patch, resolving an alarm, a firmware update), the customer doesn't have to travel on site to triage the issue, which can mean faster time to service any issue that arises. They can simply log in remotely, perform an action, and log out, moving to a more scheduled, proactive maintenance/service model.

Example security benefit: The solution adds a layer of modern security to very old controller technology (and thus typically insecure) and makes it so the customer and only the customer can access these controllers. This is a major improvement to previous ways of connecting remotely, which usually involved public Static IPs and VPNs because it reduces the likelihood that the entire network is accessible from the internet or the 3rd party contractor's computer. Less time bothering on-site IT people, more secure communications, and therefore less risk of a cybersecurity incident for the customer.

In some implementations, end users cannot access the secure lobby or run discovery scans from the local secure edge dashboard. In some implementations, there is no way for the local secure edge dashboard to access the secure lobby or run any Discovery scans. In some implementations, the only way to access the secure lobby and its functionality is from the Management Console. In some implementations, traffic outside the secure lobby overlay is not allowed, because that is a principle way to exploit lateral movement to spread the attack surface after a breach.

There are many possibilities for the endpoint devices 181-183. In a specific implementations, the endpoint devices 181-183 can include:

RDP (Remote Desktop Protocol) enabled Windows Laptop (Port 3389)

SSH (Secure Shell) enabled Linux on a Raspberry Pi (Port 22)

Web-enabled IP Camera (Port 80)

A detailed example with these specific endpoint devices is provided later. However, it is to be understood that there are numerous possibilities for the endpoint devices 181-183. Other possibilities include PLC (programmable logic controller) devices. In some implementations, in the case of multiple endpoint devices 181-183, there may be provided a switch (not shown) for connecting the multiple endpoint devices 181-183 to the secure edge device 140.

Figure 1B:
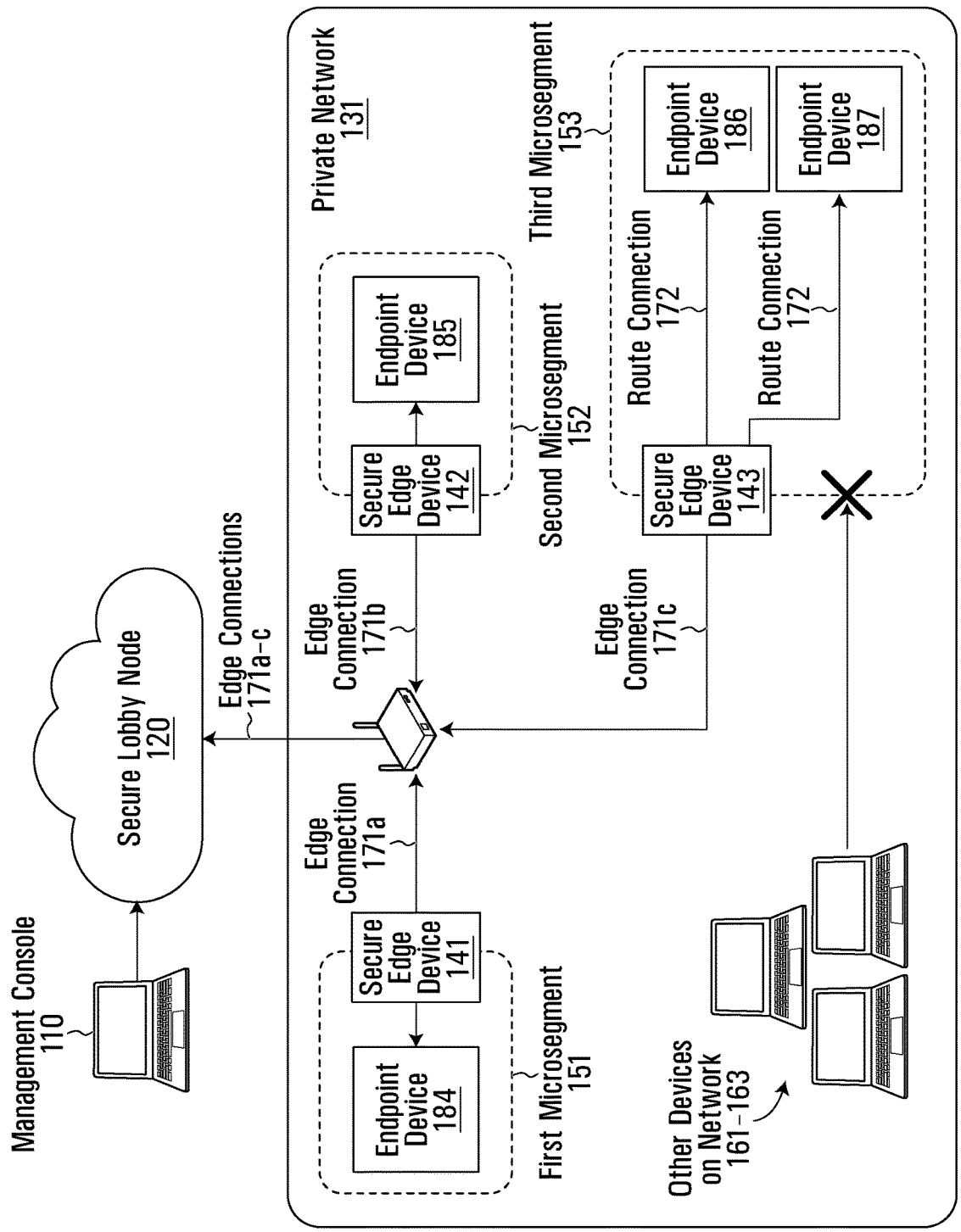
FIG. 1B is a block diagram of another example communication system featuring multiple microsegments within a private network and the secure lobby node which is external to the private network.

Referring now to FIG. 1B, shown is a block diagram of another example communication system featuring multiple microsegments 151-153 within a private network 131 and the secure lobby node 120 which is external to the private network 131. The microsegments 151-153 have varying number of endpoint devices. In the illustrated example, the first microsegments 151 has one endpoint device 184, the second microsegments 152 has one endpoint device 185, and the third microsegments 153 has two endpoint devices 186-187. Other configurations are possible and are within the scope of the disclosure.

Edge connections 171*a-c* can be established between the secure edge devices 141-143 and the secure lobby node 120 as similarly described above for FIG. 1A. In some implementations, each secure edge device 141-143 creates an encrypted secure lobby tunnel through an edge connection with the secure lobby node 120, not with each other across the LAN. In some implementations, all traffic is routed centrally through the secure lobby node 120 before reaching any secure edge device 141-143. Also, within each microsegments 151-153, route connections 172 can be established for connectable devices 184-187 as similarly described above for FIG. 1A. For example, within the third microsegment 153, route connections 172 can be established for connectable devices 186-187 as shown. The private network 131 may also have other devices 161-163 which are separate from the microsegments 151-153. These other devices 161-163 are not able to connect with any of the microsegments 151-153 as similarly described above for FIG. 1A.

Figure 1D:
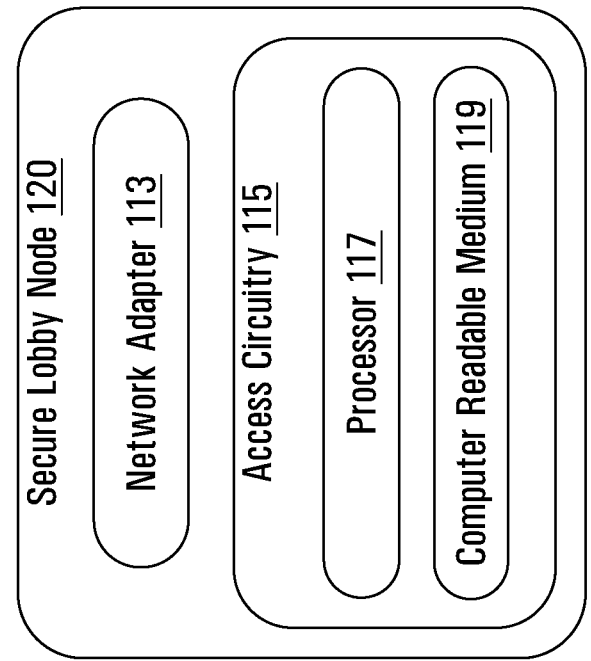
FIG. 1D is a block diagram of an example secure lobby node.
Figure 1C:
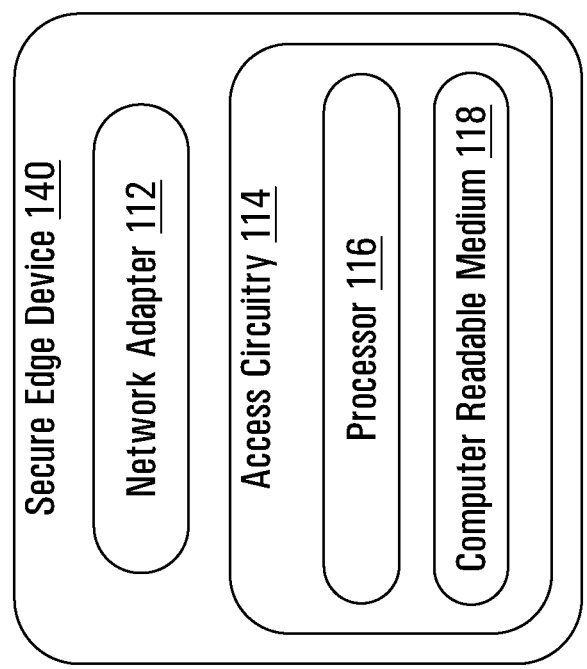
FIG. 1C is a block diagram of an example secure edge device of a microsegment.

There are many possibilities for the secure edge devices 140-143 and the secure lobby node 120 described above. Referring now to FIGS. 1C and 1D, shown is a block diagram of an example secure edge device 140 (FIG. 1C) and a block diagram of an example secure lobby node 120 (FIG. 1D).

The secure edge device 140 has a network adapter 112 for communicating with the secure lobby node 120 and endpoint devices. The secure edge device 140 also has access circuitry 114, which operates the secure edge device 140 to implement the functionality described above in relation to FIG. 2. In some implementations, the access circuitry 114 includes a processor 116 that executes software, which can stem from a computer readable medium 118. However, other implementations are possible and are within the scope of this disclosure. It is noted that other implementations can include additional or alternative hardware components, such as any appropriately configured FPGA (Field-Programmable Gate Array), ASIC (Application-Specific Integrated Circuit), and/or microcontroller, for example. More generally, the access circuitry 114 of the secure edge device 140 can be implemented with any suitable combination of hardware, software and/or firmware.

The secure lobby node 120 has a network adapter 113 for communicating with secure edge devices and management consoles. The secure lobby node 120 also has access circuitry 115, which operates the secure lobby node 120 to implement the functionality described above in relation to FIG. 2. In some implementations, the access circuitry 115 includes a processor 117 that executes software, which can stem from a computer readable medium 119. However, other implementations are possible and are within the scope of this disclosure. It is noted that other implementations can include additional or alternative hardware components, such as any appropriately configured FPGA, ASIC, and/or microcontroller, for example. More generally, the access circuitry 115 of the secure lobby node 120 can be implemented with any suitable combination of hardware, software and/or firmware.

According to another embodiment of the disclosure, there is provided a non-transitory computer readable medium having recorded thereon statements and instructions that, when executed by processors of a communication system, implement a method as described herein. The processors can be the processors 116-117 of the secure edge device 140 and the secure lobby node 120 shown in FIGS. 1C and 1D, or some other processors. The non-transitory computer readable medium can be the computer readable mediums 118-119 of the secure edge device 140 and the secure lobby node 120 shown in FIGS. 1C and 1D, or some other non-transitory computer readable medium. The non-transitory computer readable medium can for example include an SSD (Solid State Drive), a hard disk drive, a CD (Compact Disc), a DVD (Digital Video Disc), a BD (Blu-ray Disc), a memory stick, or any appropriate combination thereof.

Example Operation & GUI

By way of overview, a secure lobby node creates a secure connection between deployed secure edge devices and a management console using an outbound connection, originating from inside of a corporate network perimeter, so as to not interfere with local network configurations.

First, an administrator initiates a connection for the secure lobby in the management console. Upon receiving the command from the management console, the secure edge device then establishes an outgoing 4096 RSA-encrypted connection with the secure lobby, which is not impacted by the corporate network firewall and does not require weakening the perimeter security of the main network. The administrator then connects their management console to the secure lobby using 4096 RSA-encrypted connection, either from their own secure edge device or a guest OpenVPN client provided by the management console.

Once the user is inside of the secure lobby, the secure edge device allows traffic to and from the protected endpoint devices, allowing the user to interact with the endpoint devices inside of the microsegment directly. This access to the endpoint devices is Layer 7 protocol agnostic, allowing both common protocols (like SSH, RDP, Virtual network computing, File Transfer Protocol, Hypertext Transfer Protocol/Hypertext Transfer Protocol Secure, etc.) and uncommon proprietary protocols to be used for accessing endpoints. It is as if the user is one-hop away from the endpoint device, even though on different networks in different locations.

With typical VPNs, access control is governed at Layer 3, where endpoint devices are either inside the tunnel or outside of the tunnel. With Secure Lobby, administrators are given access and control at Layer 4 to control which ports and services are open/closed inside of Secure Lobby. This can enable granular access control. A Layer 4 VPN is network-independent as it sits above the network layer. The session stays open regardless of whether or not the client switches between networks, maintaining a continuous connection for both the user and the application.

Referring now to FIGS. 3 through 16, shown are screenshots of an example GUI enabled by a secure lobby node for display by a management console to facilitate conditional access to endpoint devices of a microsegment within a private network. It is to be understood that the these screenshots are very specific and are provided merely for exemplary purposes. Other GUIs are possible and are within the scope of the disclosure. Also, accompanying details concerning operation are very specific and are provided merely for exemplary purposes.

Each secure edge device can run a discovery of all endpoint devices connected to it. In the management console, an administrator navigates to "Quick Access", selects a secure edge device, and then clicks "Secure Lobby". When the administrator clicks "Run Discovery" as shown as item 301 in FIG. 3, the secure edge device will perform a discovery scan of all endpoint devices inside the microsegment.

Once the discovery scan is complete, the management console displays a table with a list of endpoint devices included inside of the microsegment as shown in FIG. 4. The management console can display information from the discovery scan including:

Endpoint—the name of the endpoint device.
IP Address—the local IP address of the endpoint device inside of the secure lobby.
MAC Address—the MAC address of the endpoint device.
Port In—the port which traffic enters the endpoint device. This Port can be customized by clicking save or edit.
Port Out—the port which traffic exits the endpoint device.
Service—the communication protocol running through that port.
Vendor—the original equipment manufacturer that manufactured the endpoint device.
Description—a brief description of what the endpoint device+port combo is used for. The port can be customized by clicking save or edit.
Last Seen—the date and time which the endpoint device was last active in the secure lobby. Now indicates an active endpoint device's port is visible in the secure lobby.
Status—there are two status icons:
 a green shield icon means the endpoint device is visible in Secure Lobby, and
 a blue list icon means the secure edge device has discovered the endpoint device.

The endpoint devices that have been discovered can become connectable devices and hence visible in the secure lobby by other users by adding them to the secure lobby. For example, the endpoint device "ssh-demo" in the first row has the blue list icon as indicated at item 401, which means that it is not currently connectable. However, the administrator can click "Add" as shown at item 402. The administrator can give the endpoint device a Description (e.g. "SSH") and confirm which Port In (e.g. "22") to communicate over.

Figure 5:
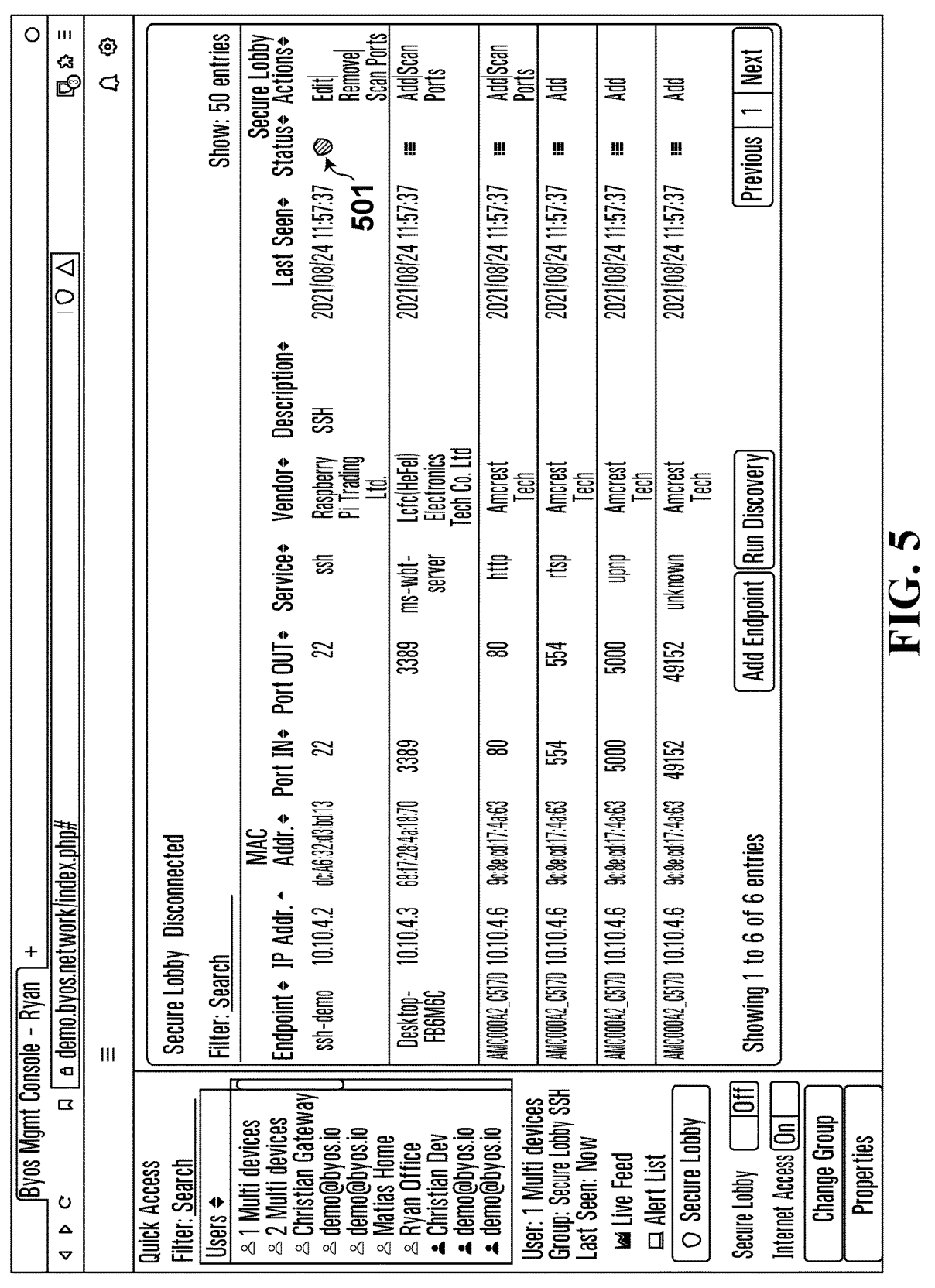

As shown in FIG. 5, the endpoint device "ssh-demo" in the first row becomes visible by any administrator connecting to the Secure Lobby as indicated by the green shield icon as indicated at item 501.

As shown in FIG. 6, the administrator can turn the Secure Lobby on or off by clicking on a toggle switch on in the left navigation bar as indicated at item 601. When Secure Lobby is off, the device is completely isolated.

Once the Secure Lobby connection has been established, the private IP address of that secure edge's microsegment is displayed at the top of the window as indicated at item 701 and shows "Now" in the Last Seen column as indicated at item 702. At this point, that IP address of the microsegment can be used to access to any of the endpoint devices that are visible in the Secure Lobby.

Another example is provided below using RDP, SSH, and Web connections inside the Secure Lobby. In this example, the secure edge device is connected to a switch, which has three endpoint devices behind it:

RDP-enabled Windows Laptop (Port 3389)
SSH-enabled Linux on a Raspberry Pi (Port 22)
Web-enabled IP Camera (Port 80)

After running a discovery scan, adding these endpoint devices to the Secure Lobby, and clicking the toggle to turn on Secure Lobby, we can see the three endpoint devices as indicated at item 802.

To access each one of these endpoint devices in the microsegment, an administrator can connect to the Secure Lobby with their computer using OpenVPN. Their computer will now be in the same Private IP range (172.20.0.X) as indicated in item 901 of FIG. 9. Example details of how to access the endpoint devices are provided below.

Figure 10:
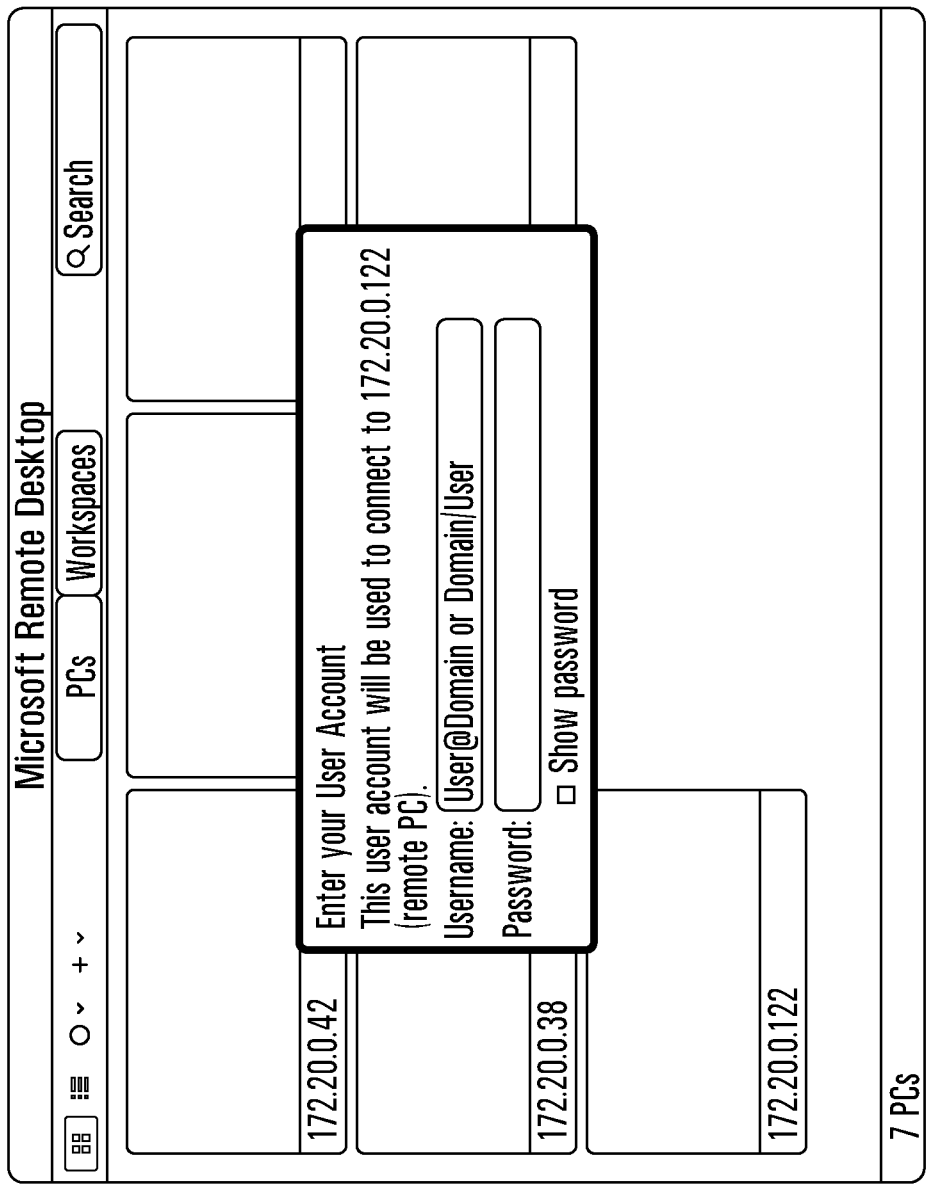
Figure 11:
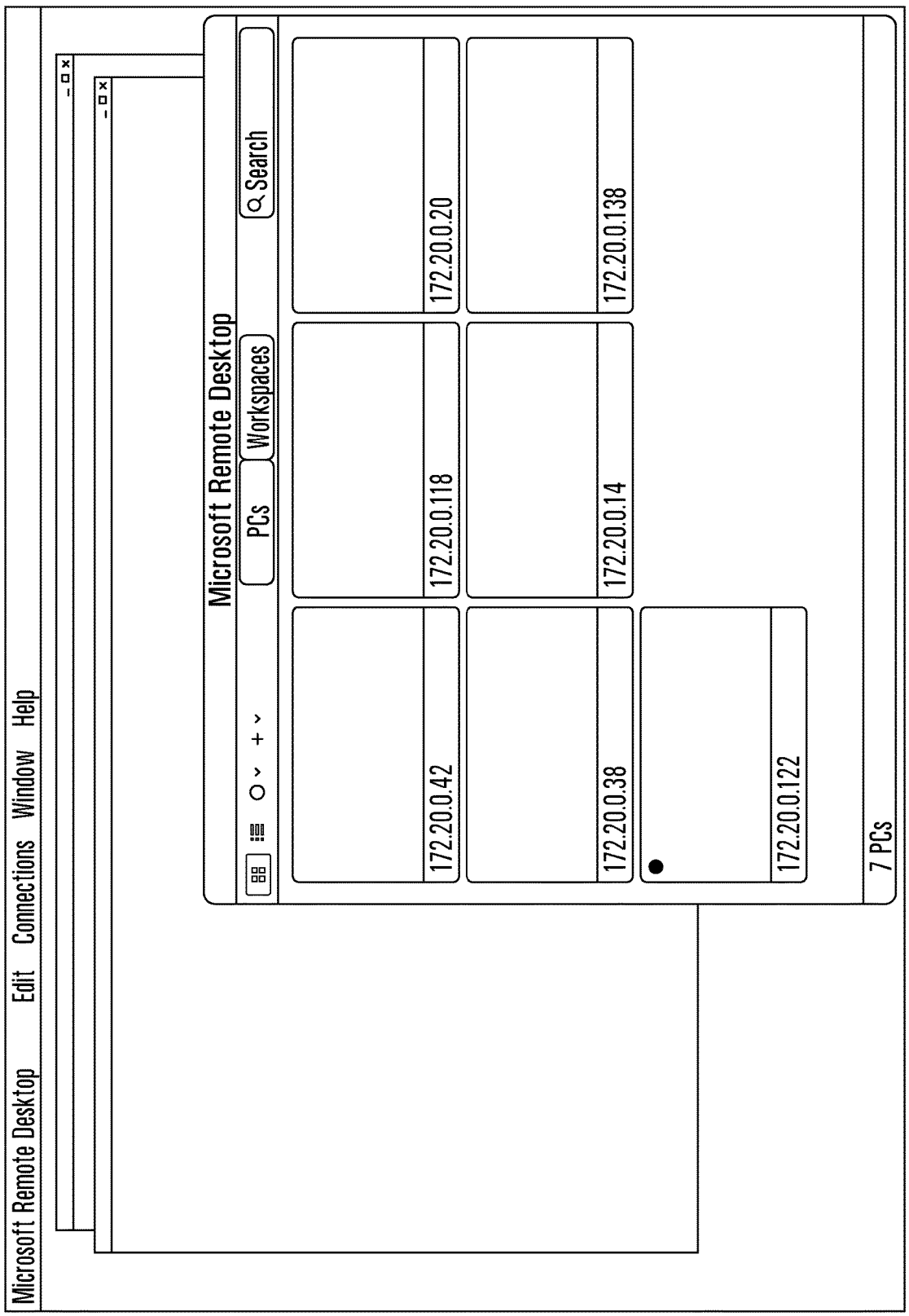

To access the RDP-enabled Windows Laptop (Port 3389), an administrator can open a Remote Desktop app and select the proper 172.20.122 microsegment, click connect, and enter login credentials for the remote PC as shown in FIG. 10, and then they are in as shown in FIG. 11.

Figure 12:
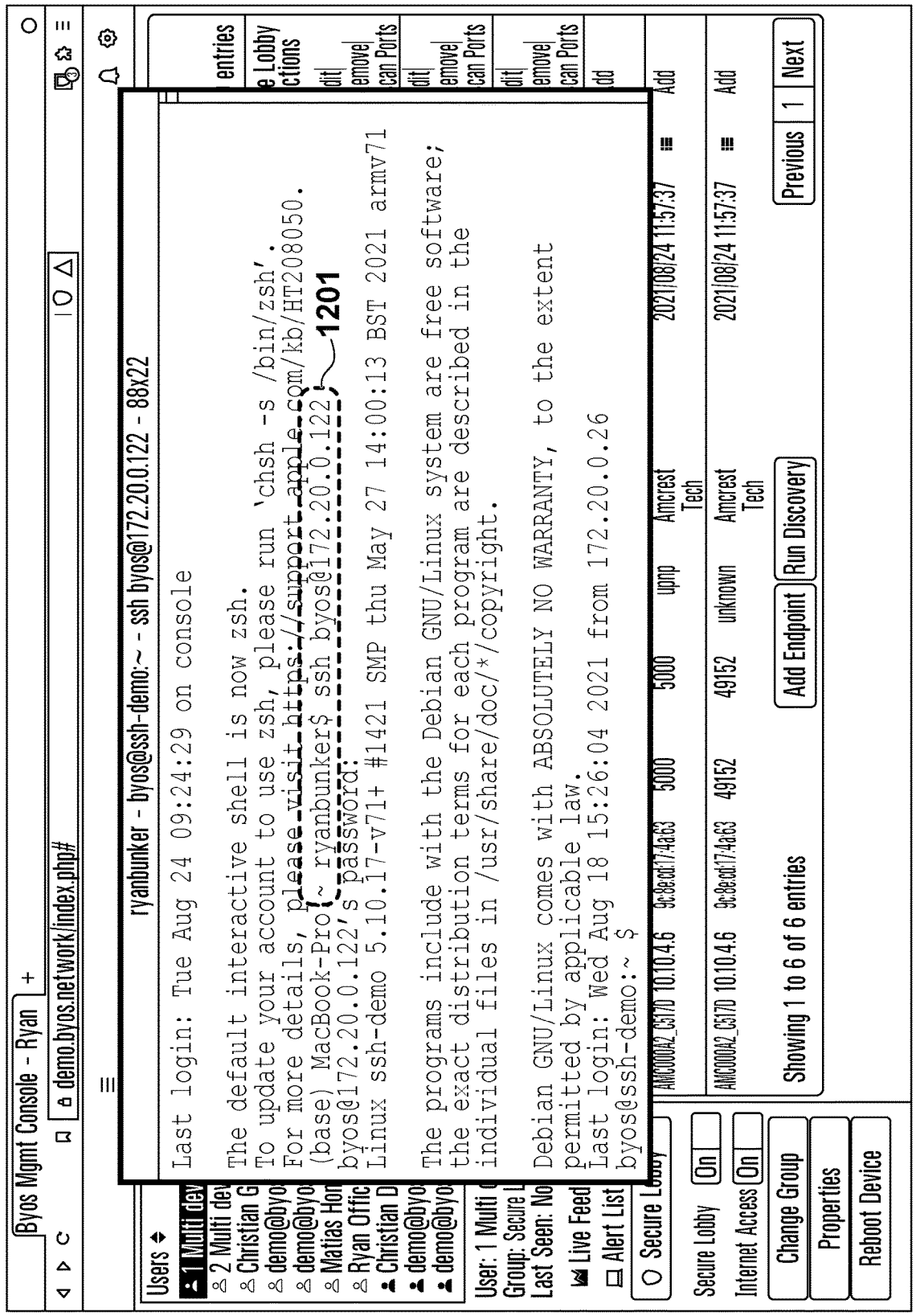
Figure 13:
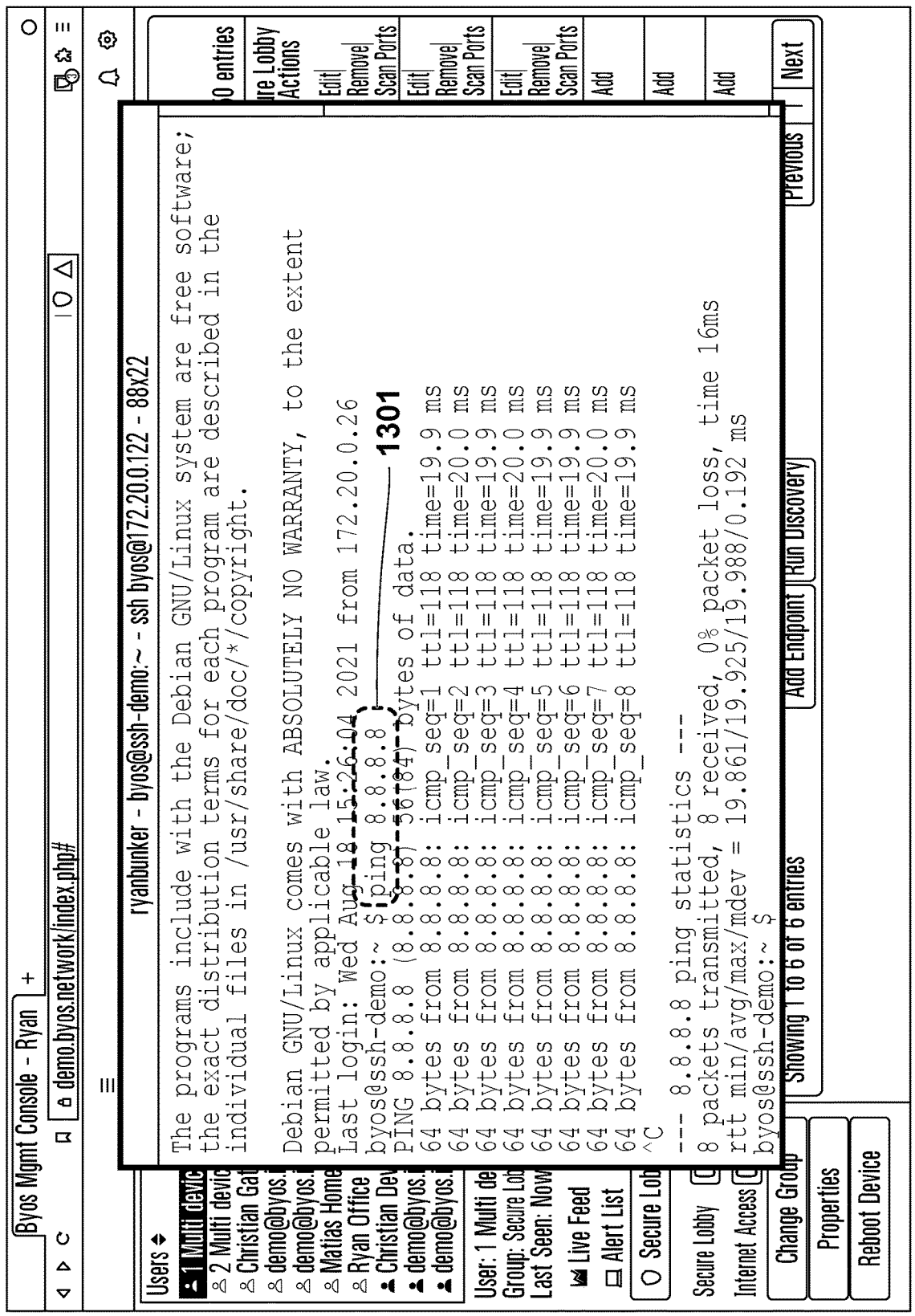

To access the SSH-enabled Linux on a Raspberry Pi (Port 22), an administrator can open a terminal, and log into the endpoint device via SSH as shown in item 1201 of FIG. 12. Once the administrator is inside of the endpoint device in the secure lobby, the administrator is free to run commands on the endpoint device. A simple ping command as shown in item 1301 of FIG. 13 demonstrates that the endpoint device can access the internet.

Figure 14:
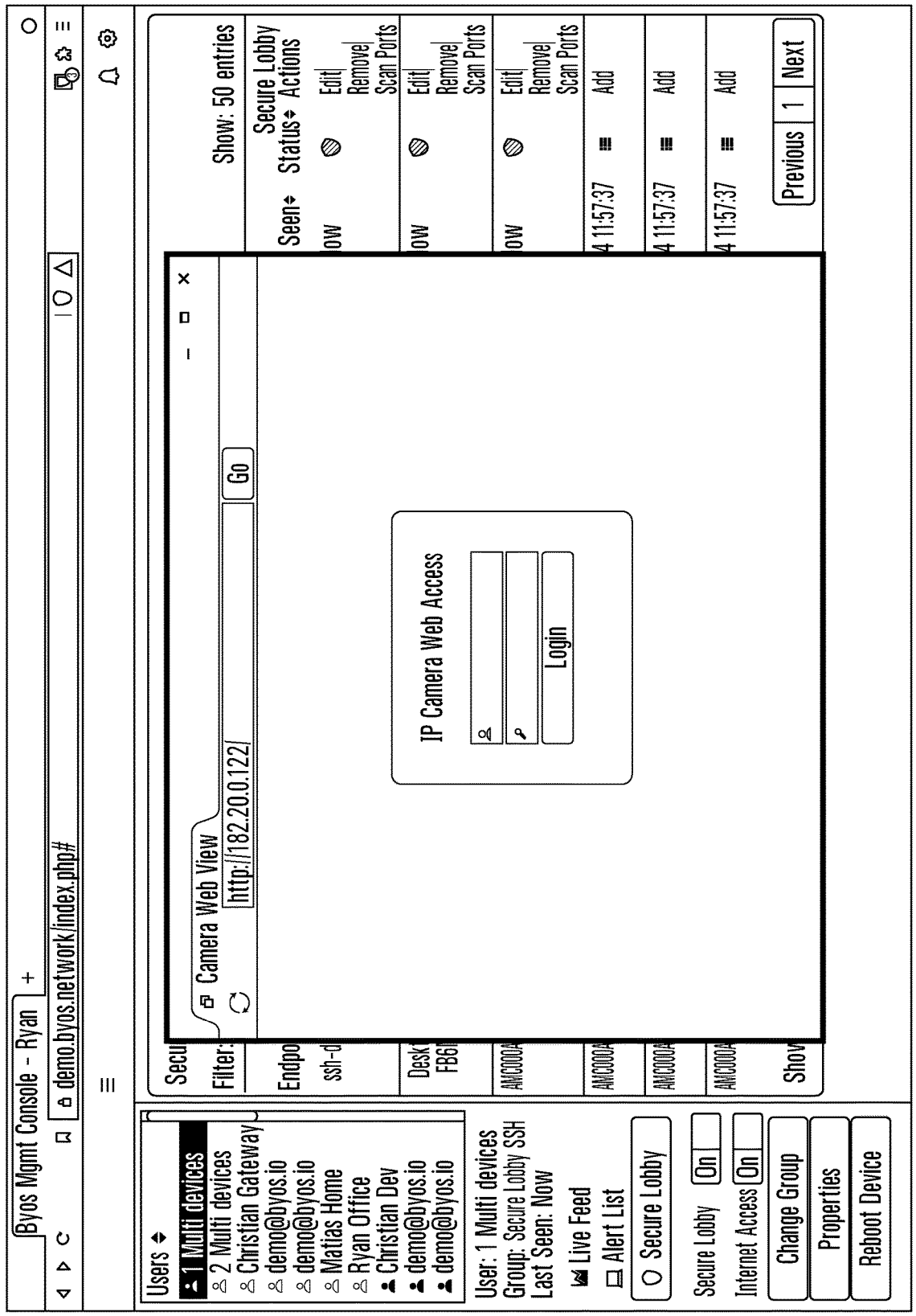
Figure 15:
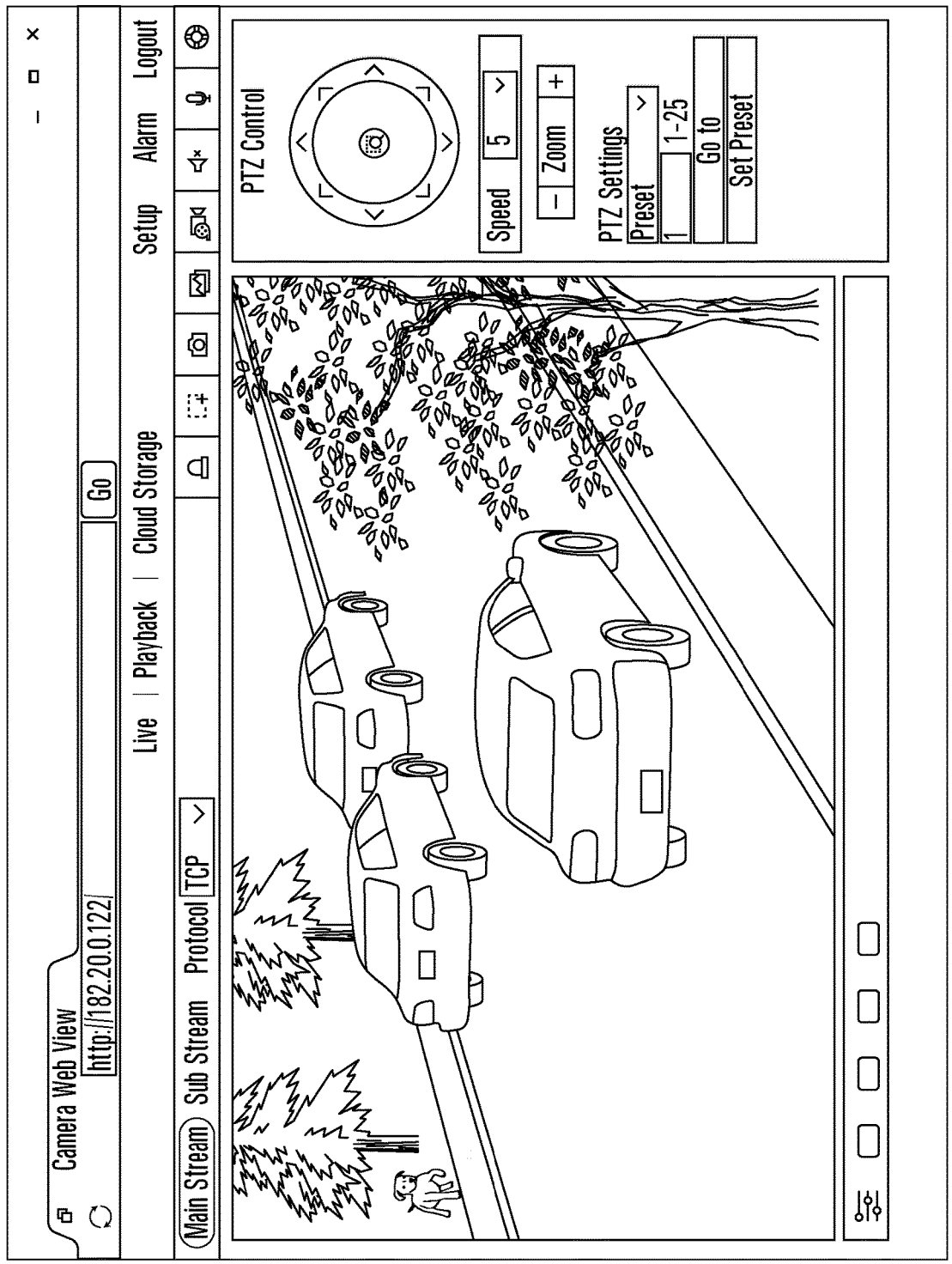

To access the Web-enabled IP Camera (Port 80), an administrator can open the camera's app and type in the Secure Lobby microsegment IP address (172.20.0.122) as shown in FIG. 14. Once logged in, the administrator can see the camera's live feed remotely as shown in FIG. 15.

Figure 16:
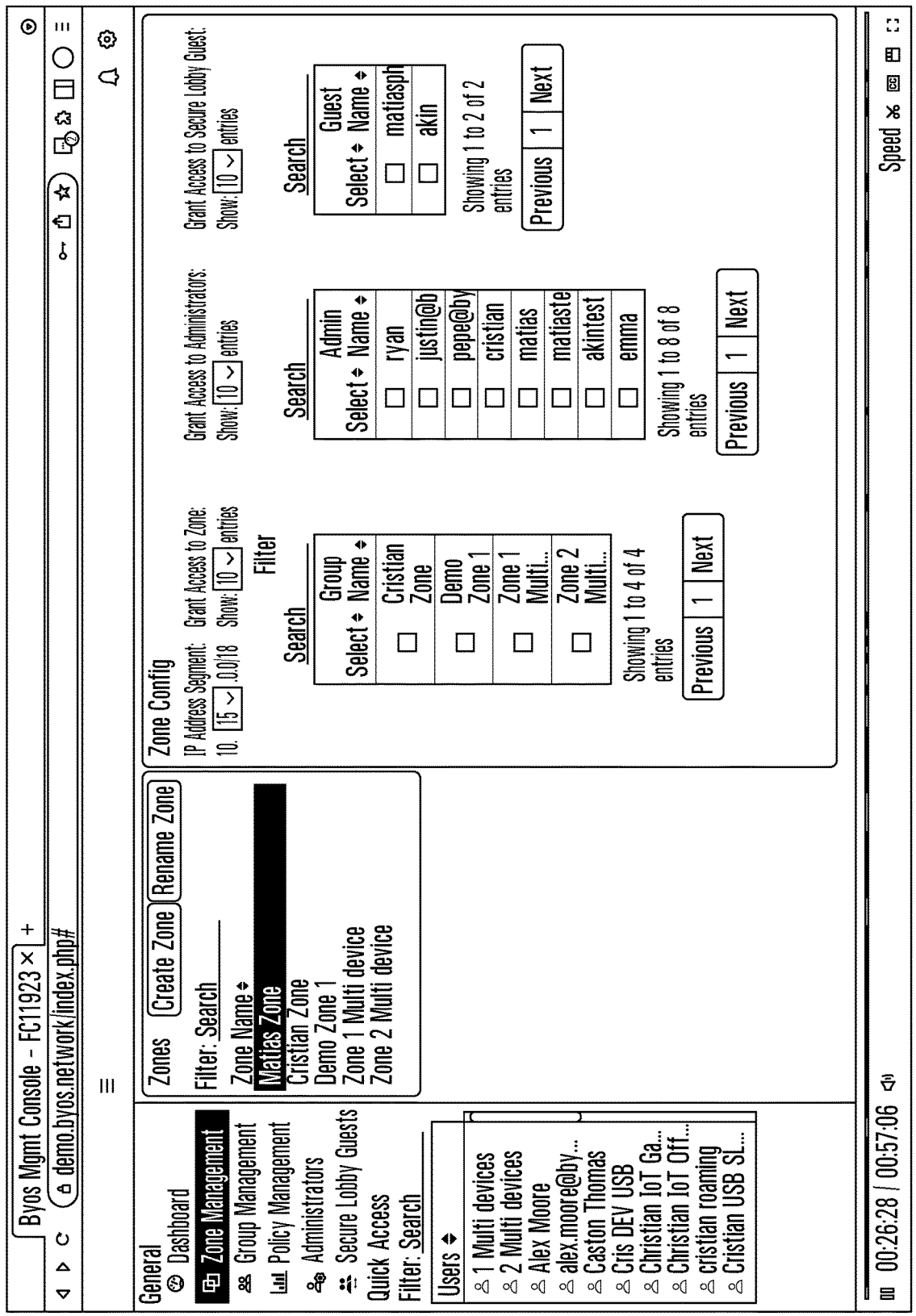

FIG. 16 shows how rules can be set for zone management. In some implementations, the rules that can be set for zone management include:

What zones can communicate with other Zones,
Which groups can communicate to other groups in other zones, and
Which admins and guests can access which zones.

Appendix A—What is Microsegmentation?

As more and more organizations migrate from a perimeter-based security model to a perimeterless architecture, the network security practices of the past can no longer effectively protect our networks. Instead of defending perimeters through firewalls and broad segmentation strategies, microsegmentation has emerged as a best practice for security professionals forced to adapt to work-from-anywhere organizations and protect against increasingly sophisticated threats.

In this section, we'll examine what microsegmentation is and how it works, and discuss how edge microsegmentation specifically can benefit organizations modernizing their security posture.

Generally, microsegmentation is a technique that divides networks into small, distinct, protected zones in order to strengthen an organization's security posture. This approach decreases risk by reducing the available attack surface within a network and makes it easier to contain and remediate security incidents if and when they occur by preventing lateral movement and privilege escalations.

In the past, security architects often used a network segmentation approach to separate networks into smaller subnets. With network segmentation, each segment is protected as its own mini-network, and administrators create policies to define how traffic can flow from one segment to another. Users, endpoint devices, and network traffic already within an organization's perimeter are automatically trusted, so protecting the enterprise's system from the world beyond it becomes the priority.

As breaches become more frequent and attacks more sophisticated, network segmentation and the assumed trust upon which it is built have become less reliable. Increased computing power, more diverse and sprawling device fleets, and increased network traffic have challenged the network segmentation approach. Insider threats are another issue, since breaches can originate from within an organization. Once an attack (from any source) has infiltrated the perimeter of an enterprise network, stopping the breach from moving laterally throughout any particular network segment is challenging. Often, attackers are able to move from server to server, endpoint device to endpoint device, or application to application unconstrained.

That's why today's leading network architects and security experts favor a Zero Trust model, in which no network activity or communication is automatically considered trustworthy. Network segmentation has evolved into microsegmentation, which takes a more granular approach to achieve that Zero Trust philosophy. Instead of isolating subnets, microsegmentation isolates single endpoint devices and creates a mini-perimeter around each one to secure it individually.

Microsegmentation can be applied in different ways and we'll be focusing primarily on edge microsegmentation in the rest of this guide, but network-based, hypervisor-based, and host-based microsegmentation are alternative implementations of this security concept:

Network-based microsegmentation relies on subnets, VLANs, or other technology to create segments. From there, policies are configured and enforced using IP constructs or ACLs and are generally applied to the segments as opposed to individual hosts.

Hypervisor-based microsegmentation relies on overlay networks created by hypervisors in virtualized environments to enforce microsegmentation. It is similar to network-based microsegmentation; the main difference is that it is implemented with hypervisor devices instead of network devices.

Host-based microsegmentation uses an agent installed on the endpoint device, leveraging the native firewall functionality built into the operating system to provide distributed and fine-grained microsegmentation.

Edge microsegmentation is a hybrid variation of network-based and host-based microsegmentation, where instead of broad segments, the network security technology is applied at the "edge" of a single endpoint device where all ingress and egress traffic can be filtered, monitored, and controlled. No agent is installed directly onto the endpoint device's operating system, but the endpoint device is within its own protected microsegment. The reasoning for having microsegmentation that is independent of the computer's Operating System (i.e. agentless) is because most attacks start through an infection on the Operating System caused by some user behaviour error. The second step any attacker takes in the killchain is to disable, modify, or evade the agent-based protections running on the Operating System. Being isolated from the Operating System means an attacker's leverage to move laterally without detection between devices on a network is stopped. An attacker won't be able to see a microsegmented device on the network.

Behind the firewall that protects a network's perimeter, edge microsegmentation helps secure the many endpoint devices that tend to sit side by side in a system's hierarchy. While network security professionals can easily monitor north-south traffic that crosses the network firewall into the organization, the east-west traffic that flows between devices has historically been less visible. To protect those endpoint devices, edge microsegmentation allows for more complete visibility into all network traffic—north-south and east-west.

Once they have complete visibility and control, network administrators can identify, isolate, and secure critical devices and design the policies that govern traffic passing in and out of each microsegment. Where network segmentation relies on policies based on subnet IP addresses, edge microsegmentation allows for granular policies that can be assigned directly to the type of endpoint device that is inside of the microsegment.

By treating each endpoint device as a segment of one, edge microsegmentation eliminates the threat of lateral movement and helps keep overall network security strong. With that said, modern enterprise architecture doesn't usually stay static.

There are immediate benefits to implementing security architecture based on edge microsegmentation, especially for organizations that have recognized their legacy technologies as a weak spot in their security posture.

Earlier this year, for example, the CISA investigated a ransomware attack on a major oil pipeline in the United States. If the facility had implemented microsegmentation security practices, the attack may have been detected sooner or prevented altogether. These are some of the key benefits of network microsegmentation:

As organizations grapple with device sprawl across many different public and private networks, perimeter-based defenses alone are no longer enough. Devices are exposed to network-based threats like exploits, Wi-Fi attacks, enumeration, and DDOS attacks. Edge microsegmentation protects against those attack vectors by securing individual endpoint devices and giving admins threat management controls to restrict the flow of traffic upon detection.

Siloing high-risk endpoint devices like critical functioning devices, industrial control systems, or medical devices away from lower-risk segments help to reduce risk by adding another layer of protection against escalating privileges across a network. This approach also allows security analysts to prevent lateral movement, stopping attacks from jumping between compromised endpoint devices and spreading throughout a system. With granular microsegments in place, security teams' increased visibility allows them to monitor traffic more easily and efficiently identify and respond to dangerous breaches.

Managing security policies across a large fleet of a variety of devices is a time-consuming task. Perimeter-based security policies also don't address issues like internal attacks and breaches that originate within the network's perimeter. Edge microsegmentation gives security teams real-time provisioning capabilities and allows them to create and enforce policies with as much granularity as they desire.

By enabling policy granularity, visibility, and control, edge microsegmentation reduces vulnerability throughout an organization and helps security teams stay compliant at every level and through any change. Edge microsegmentation allows security teams to ensure that distributed devices across different networks are all protected by unified network security and even makes security auditing and incident remediation easier thanks to the isolation of separately secured endpoint devices.

As enterprises look to modernize their security architecture, ease of implementation and fleet-wide compatibility will factor into choosing an appropriate solution. Meanwhile, remote work (and the hybrid version that is likely to persist in the post-pandemic future) presents new challenges to network security. As distributed teams settle into the new normal and the remote and roaming workforce continues telecommuting, network security will become an increasingly pressing concern.

The disclosed approach aims to help organizations protect themselves and their employees from the inherent risks associated with managing network connectivity. With the disclosed approach, members of an organization can safely connect to any network with confidence, regardless of where they are or what device they're using. How do we do it? The secure edge device uses microsegmentation to secure each individual endpoint device.

Numerous modifications and variations of the present disclosure are possible in light of the above teachings. It is therefore to be understood that within the scope of the appended claims, the disclosure may be practised otherwise than as specifically described herein.

We claim:

1. A method for conditionally enabling access to endpoint devices of a microsegment within a private network from a management console which is external to the private network, wherein the microsegment has a secure edge device which restricts traffic between the endpoint devices of the microsegment and devices outside of the microsegment, the method comprising:
  establishing, by the secure edge device, an edge connection with a secure lobby node which is external to the private network;
  discovering, by the secure edge device, all of the endpoint devices within the microsegment;
  identifying, by the secure edge device, which of the endpoint devices are connectable devices and establishing a route connection for each connectable device;
  transmitting, by the secure edge device to the secure lobby node, information identifying all of the endpoint devices and which of the endpoint devices are connectable devices;
  establishing, by the secure lobby node, a console connection with the management console;
  conveying, by the secure lobby node to the management console, the information identifying all of the endpoint devices and which of the endpoint devices are connectable devices;
  enabling, by the secure lobby node and the secure edge device, one-hop traffic between the management console and any of the connectable devices of the microsegment via a secure connection including the console connection, the edge connection, and the route connection for the connectable device; and
  maintaining, by the secure edge device, a session layer permission list, wherein identifying which of the endpoint devices are connectable devices is based on the session layer permission list,
  wherein the session layer permission list defines zones within the private network and permissions for users to access those zones.

2. The method of claim 1, comprising:
  identifying, by the secure edge device, what services are permitted for each connectable device;
  conveying, by the secure edge device to the secure lobby node, information identifying what services are permitted for each connectable device; and
  conveying, by the secure lobby node to the management console, the information identifying what services are permitted for each connectable device.

3. The method of claim 2, comprising:
  maintaining, by the secure edge device, a transport layer permission list, wherein identifying what services are permitted for each connectable device is based on the transport layer permission list.

4. The method of claim 3, further comprising:
  updating, by the secure edge device, the transport layer permission list in response to input from the management console.

5. The method of claim 1, further comprising:
  updating, by the secure edge device, the session layer permission list in response to input from the management console.

6. The method of claim 1, further comprising:
  attempting to authenticate the management console for permission to access the microsegment;
  wherein the secure connection between the management console and the endpoint device is established only if the management console has been authenticated.

7. The method of claim 6, wherein the attempting to authenticate comprises:
  confirming, by the secure lobby node, whether the management console has a valid configuration file.

8. The method of claim 1, wherein the secure connection between the management console and the endpoint device is a layer 4 VPN (Virtual Private Network) connection which can remain open even if the management console switches between networks.

9. The method of claim 8, wherein the layer 4 VPN connection is an RSA (Rivest-Shamir-Adleman) encrypted connection.

10. The method of claim 9, wherein the RSA encrypted connection has a key size of 4096 bits.

11. A non-transitory computer readable medium having recorded thereon statements and instructions that, when executed by processors of a communication system, implement a method according to claim 1.

12. A system for conditionally enabling access to endpoint devices of a microsegment within a private network from a management console which is external to the private network, comprising a secure lobby node and at least one secure edge device for use in a communication system, wherein the system for conditionally enabling access is configured to implement a method according to claim 1.

* * * * *